(12) United States Patent
Schimmeyer

(10) Patent No.: US 7,819,467 B1
(45) Date of Patent: Oct. 26, 2010

(54) SHOPPING CART SEAT

(76) Inventor: Werner K. Schimmeyer, 6111 Palmero Cir., #28, Cameron Park, CA (US) 95682

( * ) Notice: Subject to any disclaimer, the term of this patent is extended or adjusted under 35 U.S.C. 154(b) by 0 days.

(21) Appl. No.: 12/579,350

(22) Filed: Oct. 14, 2009

(51) Int. Cl.
*A47C 9/00* (2006.01)

(52) U.S. Cl. .................. 297/14; 297/217.7; 297/255; 297/256.17; 280/33.993

(58) Field of Classification Search .............. 297/14, 297/217.1, 217.7, 254, 255, 256.17; 280/33.993
See application file for complete search history.

(56) References Cited

U.S. PATENT DOCUMENTS

| | | | | |
|---|---|---|---|---|
| 839,944 | A | * | 1/1907 | Martin ................ 297/254 |
| 1,223,272 | A | * | 4/1917 | Gurley ................ 297/298 |
| 1,299,827 | A | * | 4/1919 | Edwards .............. 297/255 |
| 2,399,792 | A | * | 5/1946 | Copp .................. 297/34 |
| 2,508,822 | A | * | 5/1950 | Goldberg ............. 297/255 |
| 3,146,026 | A | | 8/1964 | Berlin |
| 3,351,380 | A | | 11/1967 | Sprague |
| 3,865,431 | A | * | 2/1975 | Zakhi ................. 297/217.1 |
| 4,324,430 | A | | 4/1982 | Dimas, Jr. et al. |
| 4,416,462 | A | | 11/1983 | Thompson |
| D281,365 | S | | 11/1985 | Gugler |
| 4,598,945 | A | | 7/1986 | Hopkins |
| 4,834,404 | A | | 5/1989 | Wood |
| 4,877,289 | A | | 10/1989 | Herrera |
| 4,947,961 | A | * | 8/1990 | Dudley ............... 280/165 |
| 4,971,343 | A | | 11/1990 | Wood |
| 5,222,641 | A | * | 6/1993 | Medeiros, Jr. ........ 297/255 |
| 5,277,473 | A | | 1/1994 | Kelly et al. |
| 5,330,250 | A | | 7/1994 | Reyes |
| 5,641,200 | A | | 6/1997 | Howell |
| 5,779,112 | A | * | 7/1998 | Krulik ............... 297/129 |
| 5,810,437 | A | | 9/1998 | Sharpe |
| 5,848,797 | A | | 12/1998 | Paez |
| 5,855,412 | A | | 1/1999 | Smith et al. |
| 5,857,226 | A | * | 1/1999 | Sommer ............. 297/254 |
| 6,390,552 | B1 | | 5/2002 | Veron |
| 6,464,238 | B2 | | 10/2002 | Reiland et al. |
| 6,540,239 | B2 | | 4/2003 | Lee, Jr. |
| 6,585,284 | B2 | | 7/2003 | Sweeney et al. |
| 2005/0218613 | A1 | | 10/2005 | Giampavolo et al. |

* cited by examiner

*Primary Examiner*—Peter R. Brown
(74) *Attorney, Agent, or Firm*—Walter A. Hackler

(57) ABSTRACT

A foldable shopping cart seat includes a back with a hook extending between columns for hanging the back on a shopping cart front. Side rails slidably disposed along corresponding columns and downwardly extendable therefrom support a seat having parallel front and back rails with a pliable material extending therebetween. Scissor-like cross pieces extend between a front and back rail of the seat and are pivotably attached thereto for enabling the seat to fold against the back for carrying the shopping cart seat to and from a retail store and supporting the seat on the floor adjacent a shopping cart front.

10 Claims, 2 Drawing Sheets

SHOPPING CART SEAT

The present invention generally relates to a shopping cart accessory and is more particularly directed to a portable, collapsible seat for attachment to a conventional shopping cart thereby providing a rest spot for a shopper.

Almost all commercial grocery establishments have shopping carts for the convenience of customers to aid them in conveying their purchase throughout the store and to check out counter. Many establishments include specialize carts for the handicapped or impaired customers and child seats which are typically affixed to the shopping cart itself.

However, many elderly and infirmed customers do not need total assistance of a motorized basket or permanent seat attached to a basket yet still find it difficult in today's very large grocery stores to shop for extended periods of time or wait for extended periods of time at check out counters.

Typically, grocery stores also do not provide any seating areas for customers to take a small rest during shopping or check out.

Accordingly, there is a need for a seat accessory which is personable and portable for transport from home to store and return for attachment to a conventional shopping cart to provide a personal rest area for a customer of the store.

SUMMARY OF THE INVENTION

A foldable shopping cart seat in accordance with the present invention generally includes a back having parallel backside columns with a pliable material extending therebetween. A hook is provided and extends between the columns for hanging the back on a shopping cart front.

Depending seat support rails are provided with each rail being slidably disposed along a corresponding column and downwardly extendable therefrom. As hereinafter described, this enables the cart seat in accordance with the present invention to be utilized with a variety of shopping carts having different basket heights.

A seat is provided having parallel front and back rails with a pliable material extending therebetween suitable for supporting a seated customer. A back rail is pivotably attached to the depending seat support rails and scissor-like crosspieces are provided which extend between the front and back rails and are pivotably attached thereto proximate ends thereof for enabling the seat to hold against the back from carrying a shopping cart seat in a folded position and supporting the seat on a floor adjacent to the shopping cart front when extended.

The seat support rails may be telescoped within the backside columns and tethered thereto.

For convenience of deployment, the tethers may comprise a biasing element such as a spring thereby enabling easy deployment of the seat and collapse, or folding, thereof for transport.

In addition, cart ties may be provided for temporarily securing the backside columns to the shopping cart below the hook and a seat tie may be provided for temporarily securing the seat in a folded configuration to facilitate carry of the seat.

BRIEF DESCRIPTION OF THE DRAWINGS

The advantages and features of the present invention will be better understood by the following description when considered in conjunction with the accompanying drawings in which.

DETAILED DESCRIPTION

Figure 1:
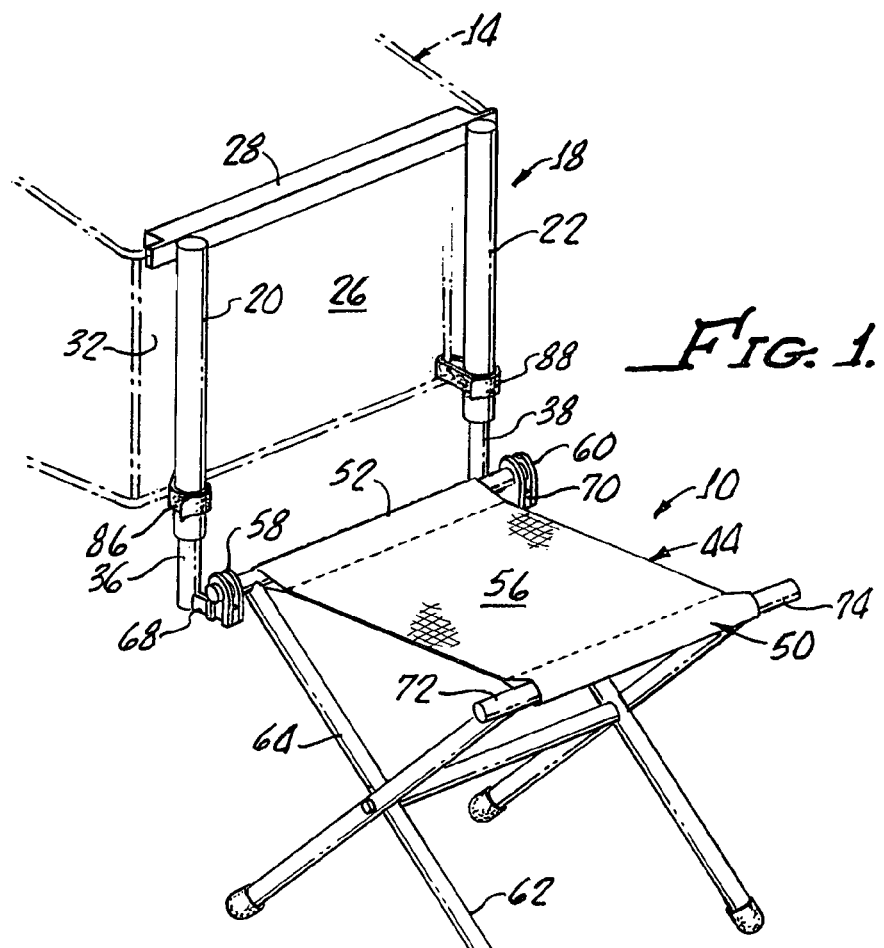
FIG. 1 is a perspective view of a foldable shopping cart seat as may be attached to a shopping cart front.
Figure 2:
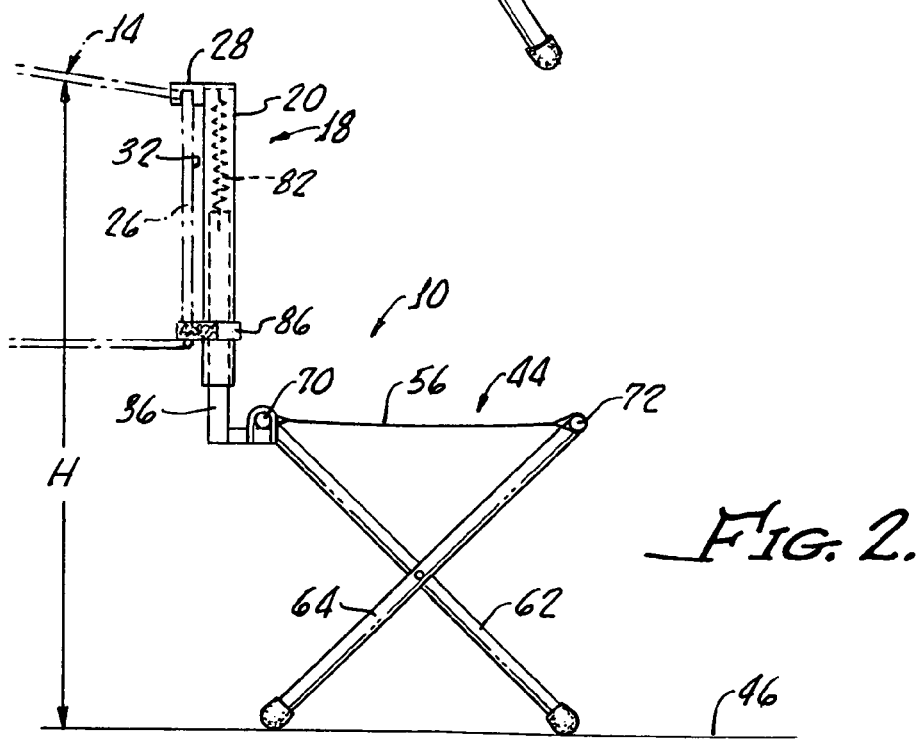
FIG. 2 is a side view of the seat shown in FIG. 1.
Figure 3:
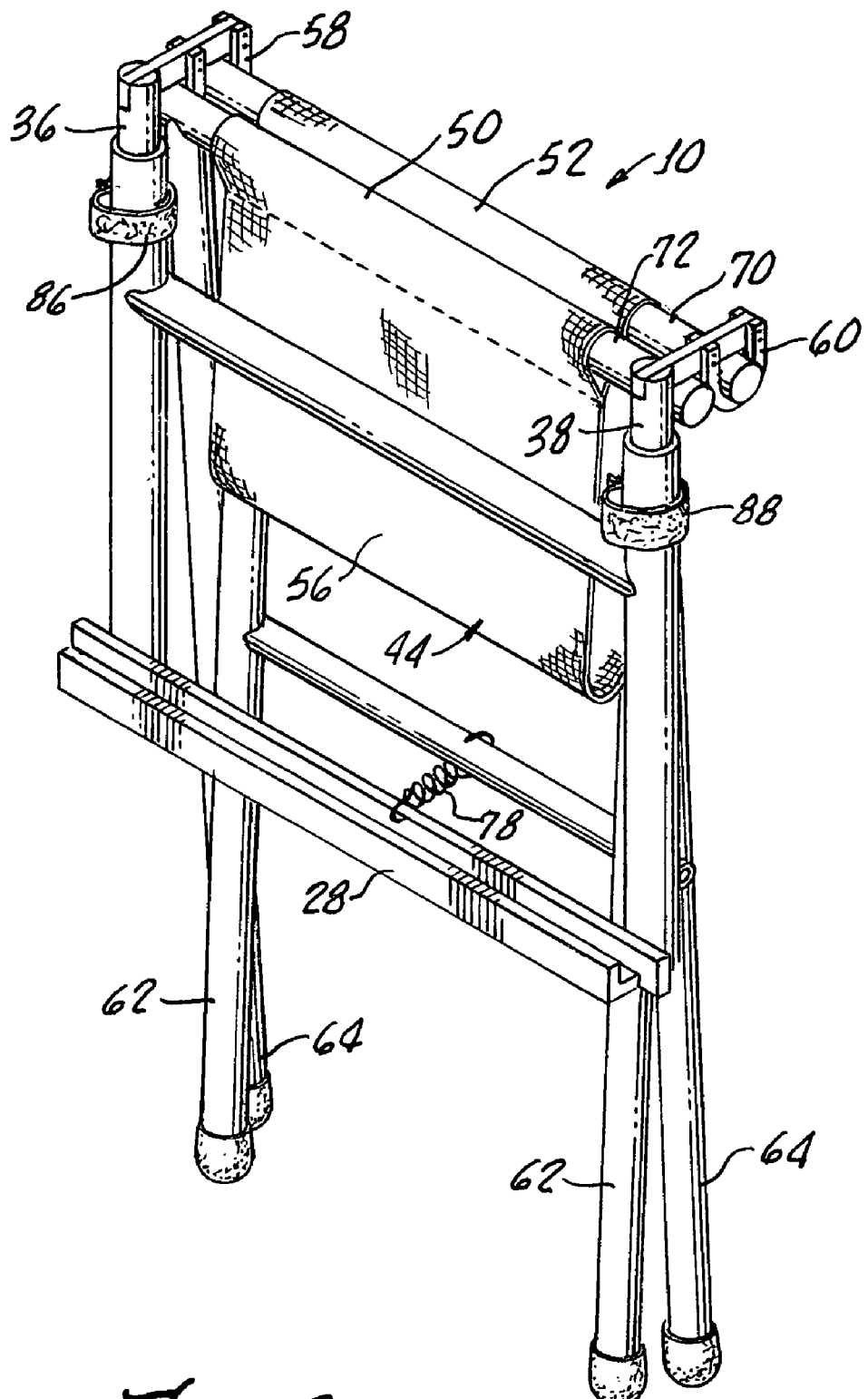
FIG. 3 is a perspective view of the seat shown in FIGS. 1 and 2 in a folded configuration.

With reference to FIGS. 1-3 there is shown a foldable shopping cart seat 10 in accordance with the present invention for use with a shopping cart 14 which generally includes a back 18 having parallel backside columns 20, 22 with a pliable material, such as a fabric 26, extending therebetween and attached to the columns 20, 22 in a conventional manner.

A hook 28 extends between the columns 20, 22 enables hanging the back 18 of the seat 10 on a shopping cart front 32 as illustrated in FIGS. 1 and 2.

Depending seat support rails 36-38 are sildably disposed along a corresponding column 20, 22 and downwardly extendable therefrom as illustrated by the arrow 42. Preferably the seat rails 36, 38 are telescoped within the columns 20, 22 as best shown in FIG. 2 which enables a seat 44 to be supported by a floor 46 in front of the cart 14 despite the height, H, of the cart front 32 from the floor 46.

The seat 44 includes parallel front and back rails 50, 52 with a pliable material, such as a fabric 56 extending therebetween and attached thereto in a conventional manner.

The back rail 52 is pivotably attached to the depending seat support rails 36, 38 via fittings 58, 60.

The seat rails 50, 52 are supported above the floor 46 by scissor-like across pieces 62, 64 extending between a front and back seat rails 50, 52 and pivotably attached thereto at ends 68, 70, 72, 74. This attachment enables folding of the seat 10 as illustrated in FIG. 3 with a seat 44 against the back 18 to facilitate carrying of the seat to and from a retail store. In that regard, a seat tie 78, which may be a conventional type bungie cord, may be provided for temporarily securing seat 10 in a folded configuration as illustrated in FIG. 3.

With reference again to FIG. 2, the seat rail 36 may be telescoped within the column 20 as shown in dashed line and tethered therein by a biasing element 82, for example a spring. Thus, when no weight is disposed on the fabric 56, a seat rail 36 moves upwardly. Conversely, when weight is applied to the fabric 56, the rail 36, 38 extend from the columns 20, 22 to a level above the floor established by the scissor-like cross pieces 62, 64.

To stabilize the back 18, against the shopping cart front 32, a pair of Velcro® straps 36, 38 may be utilized in a conventional manner.

Although there has been hereinabove described a specific shopping cart seat in accordance with the present invention for the purpose of illustrating the manner in which the invention may be used to advantage, it should be appreciated that the invention is not limited thereto. That is, the present invention may suitably comprise, consist of, or consist essentially of the recited elements. Further, the invention illustratively disclosed herein suitably may be practiced in the absence of any element which is not specifically disclosed herein. Accordingly, any and all modifications, variations or equivalent arrangements which may occur to those skilled in the art, should be considered to be within the scope of the present invention as defined in the appended claims.

What is claimed is:

1. A foldable shopping cart seat comprising:
   a back having parallel back side columns with a pliable material extending therebetween;
   a hook extending between the columns for hanging said back on a shopping cart front;
   depending seat support rails, each rail being slidably disposed along a corresponding column and downwardly extendable therefrom;

a seat having parallel front and back rails with a pliable material extending therebetween, the back rail being pivotably attached to the depending seat support rails; and scissor-like crosspieces attached the front and back rail and extending therebetween, for enabling said seat to both fold against said back and support the seat on a floor adjacent the shopping cart front.

2. The seat according to claim 1 wherein the seat support rails are telescoped within the back side columns.

3. The seat according to claim 2 wherein the seat support rails are biased within the back side columns.

4. The seat according to claim 3 further comprising springs for biasing the seat support rails.

5. The seat according to claim 4 further comprising cart ties for temporarily securing the back side columns to the shopping cart front below said hooks.

6. The seat according to claim 5 further comprise seat ties for temporarily securing the seat in a folded configuration to facilitate carrying of the seat.

7. A foldable shopping cart seat comprising:

a back having parallel back side columns with a pliable material extending therebetween;

a hook extending between the columns for hanging said back on a shopping cart front;

depending seat support rails, each rail being slidably disposed along a corresponding column and downwardly extendable therefrom;

a seat having parallel front and back rails with a pliable material extending therebetween, the back rail being pivotably attached to the depending seat support rails;

scissor-like crosspieces attached to the front and back rail and extending therebetween, for enabling said seat to fold against said back and support the seat on a floor adjacent the shopping cart front; and seat ties for temporarily securing the seat in a folded configuration to facilitate carrying the seat.

8. The seat according to claim 7 wherein the seat support rails are telescoped within the back side columns.

9. The seat according to claim 8 wherein the seat support rails are biased within the back side columns.

10. The seat according to claim 9 further comprising springs for biasing the seat support rails.

* * * * *